United States Patent

Hohenegger et al.

Patent Number: 5,548,440
Date of Patent: Aug. 20, 1996

[54] HIGH-REFLECTION SILVER MIRROR

[75] Inventors: Karl Hohenegger, Balzers, Liechtenstein; Peter Wierer, Bludenz, Austria

[73] Assignee: Balzers Aktiengesellschaft, Balzers, Liechtenstein

[21] Appl. No.: 228,402

[22] Filed: Apr. 15, 1994

[30] Foreign Application Priority Data

Apr. 15, 1993 [CH] Switzerland ............... 1139/93

[51] Int. Cl.$^6$ .............. G02B 5/08; G02B 5/26
[52] U.S. Cl. .............. 359/360; 359/584; 359/883; 359/884
[58] Field of Search ............... 359/359, 360, 359/584, 585, 589, 883, 884

[56] References Cited

U.S. PATENT DOCUMENTS

| | | | |
|---|---|---|---|
| 3,849,244 | 11/1974 | Groth | 359/360 |
| 3,978,273 | 8/1976 | Groth | 359/360 |
| 4,312,570 | 1/1982 | Southwell | 359/584 |
| 4,413,877 | 11/1983 | Suzuki et al. | 359/360 |
| 4,556,277 | 12/1985 | Fan et al. | 359/589 |
| 4,799,745 | 1/1989 | Meyer et al. | 359/360 |
| 4,822,120 | 4/1989 | Fan et al. | 359/589 |
| 4,828,346 | 5/1989 | Jacobson et al. | 359/360 |
| 4,840,442 | 6/1989 | Mouchart et al. | 359/359 |
| 4,927,246 | 5/1990 | Ito et al. | 359/359 |
| 5,000,528 | 3/1991 | Kawakatsu | 359/360 |
| 5,019,458 | 5/1991 | Elgat et al. | 359/883 |
| 5,216,551 | 6/1993 | Fujii | 359/884 |
| 5,333,090 | 7/1994 | Baumeister et al. | 359/584 |

OTHER PUBLICATIONS

Search Report for CH 01139/93.

*Primary Examiner*—Ricky D. Shafer
*Attorney, Agent, or Firm*—Notaro & Michalos

[57] ABSTRACT

An environmentally stable silver mirror having very high reflection values over a large spectral range comprises a silver layer disposed on a substrate, which is covered by a zinc sulfide layer. So that the sulphur being set free during the application or during the vaporization of the zinc sulfide to be applied, does not attack the silver, at least one barrier or intermediate layer is placed between the silver layer and the zinc sulfide layer.

7 Claims, 3 Drawing Sheets

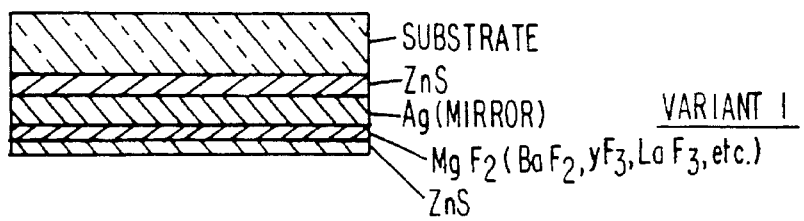
FIG.3a — VARIANT 1
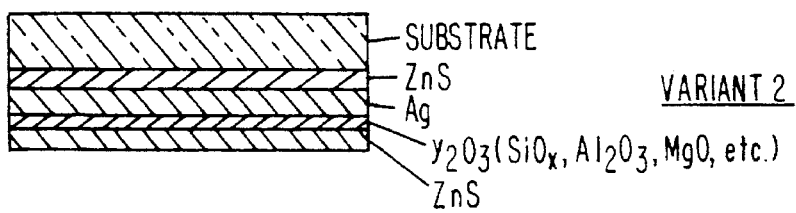
FIG.3b — VARIANT 2
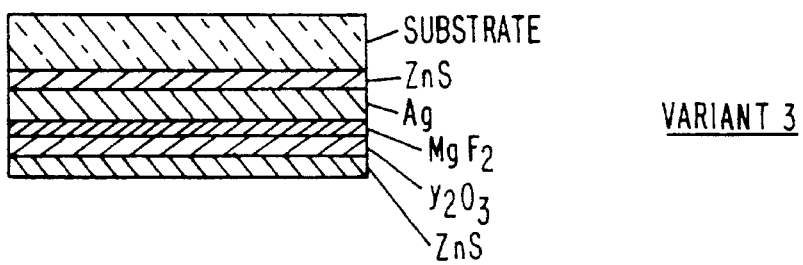
FIG.3c — VARIANT 3
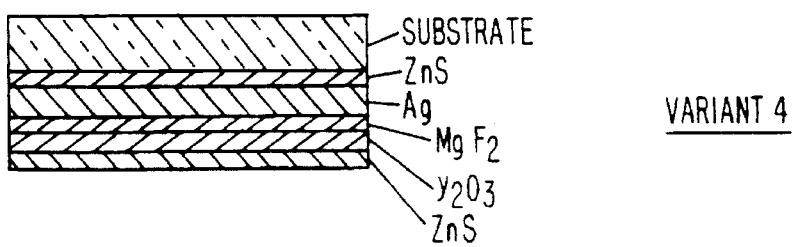
FIG.3d — VARIANT 4
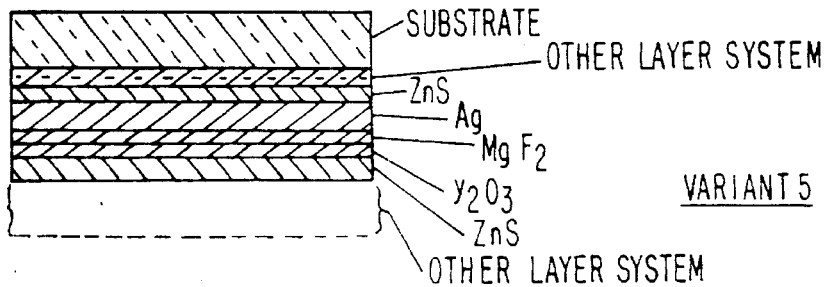
FIG.3e — VARIANT 5

HIGH-REFLECTION SILVER MIRROR

FIELD AND BACKGROUND OF THE INVENTION

The present invention relates, in general, to a high-reflection silver mirror, and specifically, to an environmentally stable silver mirror having very high reflection values over a wide spectral range.

Silver is a material with excellent optical properties. It is used inter alia in the production of highly reflecting mirrors and, in particular, for the production of elements for regulating solar energy transmission, such as architectural glass coatings, heat protection layers, automobile windows and the like. The use of silver as an optical thin-film material is extensively described for example in the publication "Thin-Film Optical Filters", H. A. Macleod, Adam Hilger Ltd., Second Edition. Unfortunately, silver has poor environmental compatibility, since it is, on the one hand, relatively soft and consequently can readily be mechanically damaged and, on the other hand, an impairment of optical properties occurs due to corrosion if the silver mirror is exposed, without protection against the environment or specific media. Silver sulfides, for example, are formed.

For this reason silver layers are frequently packed in layer systems wherein the material selected for the remaining layers is determined, on the one hand, by the desired optical properties such as spectral properties, as well as, on the other hand, by the necessity of increasing the resistance of the silver layer relative to environmental influences. A consideration of the nucleation properties of silver on these materials is also of significance, however.

Oxides, zinc sulfide, nitrides or metals are frequently used in order to pack silver. In particular, oxides are used due to their optical properties and their resistance and also because of their hardness. Applying the oxide layer, however, can already cause a degradation of the silver which is the reason why, in prior art, measures have been suggested in order to avoid this problem.

For example, DE-OS-33 07 661 suggests first covering the silver layer with a further metal layer comprises aluminum, titanium, tantalum, chromium, manganese or zirconium, onto which further metal layers, and lastly an oxide layer, are disposed, comprising indium oxide, tin oxide or a mixed oxide thereof. DE-OS-35 43 178 suggests a multilayer covering wherein the silver layer, in turn, is covered by a further metal layer comprising tantalum, tungsten, nickel or iron, which further metal layer, in turn, is covered by an oxide layer, wherein $SnO$, $SiO_2$, $Al_2O_3$, $Ta_2O_5$ or $ZrO_2$ are suggested as the Oxide layers.

In analogous manner, U.S. Pat. No. 3 682 528 suggests covering the silver layer with a thin nickel layer, should further layers be applied.

According to another variant, DE 30 27 256 suggests applying at least one hypostoichiometric oxide layer on the silver, comprising, for example, titanium oxide or titanium nitride or a mixture thereof.

Lastly, DE-A-33 29 504 suggests covering the silver layer with a dielectric layer wherein the material composition in the region of the transition areas, changes gradually and continuously. Titanium oxide is mentioned, for example, as such a dielectric layer.

SUMMARY OF THE INVENTION

The task of the present invention resides in suggesting an environmentally stable silver mirror having very high reflection values over a very large spectral range.

According to the invention a high-reflection silver mirror of this type is suggested comprising at least one silver layer disposed on a substrate, which layer is covered by a zinc sulfide layer, characterized in that between the silver layer and the zinc sulfide layer, at least one barrier or intermediate layer is disposed.

A high-reflection silver mirror comprises at least one silver layer to be disposed on a substrate, which is covered by a zinc sulfide layer, wherein, as an essential feature of the invention, at least one intermediate layer or a barrier layer is placed between the silver layer and the zinc sulfide layer. This barrier layer comprises a dielectric material.

Materials for the barrier or intermediate layer include oxides of the elements silicon, aluminum, magnesium, of groups VIb, Vb, and IVb, as well as scandium, yttrium, calcium, strontium, zinc, iron, indium, tin, cerium, holmium; as well as oxides of mixtures or alloys of these elements (in particular indium tin oxide); and further oxinitrides of the elements Ti, Ta, Zr, Si, Hf, and Al, as well as fluorides of the elements magnesium, barium, strontium, calcium, the rare earths and lead.

According to a preferred embodiment magnesium fluoride is used for production of the barrier or intermediate layer, wherein the layer thickness can be determined by the desired optical function, in general is <1 µm, but preferably <100 nm.

According to a further embodiment, it is also possible to provide two barrier or intermediate layers, wherein the one barrier or intermediate layer is an oxide and the other is a fluoride.

According to the invention it is also essential to provide, between the substrate and the silver layer, at least one further intermediate layer, wherein this layer again is mainly a protective layer. This further intermediate layer can comprise for example zinc sulfide. For particular applications it may be necessary that, in addition to this layer, further layers must be placed between the substrate and the silver layer, be that in order to increase further the reflection (application of optical correction layers, for example, with so-called rear-surface mirrors) or for the purpose of applying adhesion enhancing layers.

Very high reflection values were measured on environmentally stable silver mirrors or deflection mirrors for angles of incidence of 45° produced according to the invention, over a very large spectral range such as for example in the range from 400 nm to 12,500 nm. The reflection values are greater than 96%. In the wave range from 500 nm to 600 nm and for wavelengths >1,200 nm, even reflection values $\geq 98\%$ were measured. In the range from 2,500 nm to 12,500 nm and from 20,000 nm to 50,000 nm even reflection values >98.5% are obtained. These values apply for non-polarized light.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 3a, 3b, 3c, 3d, and 3e are schematic views of five variants of the invention.

DESCRIPTION OF THE PREFERRED EMBODIMENTS

Figure 1:
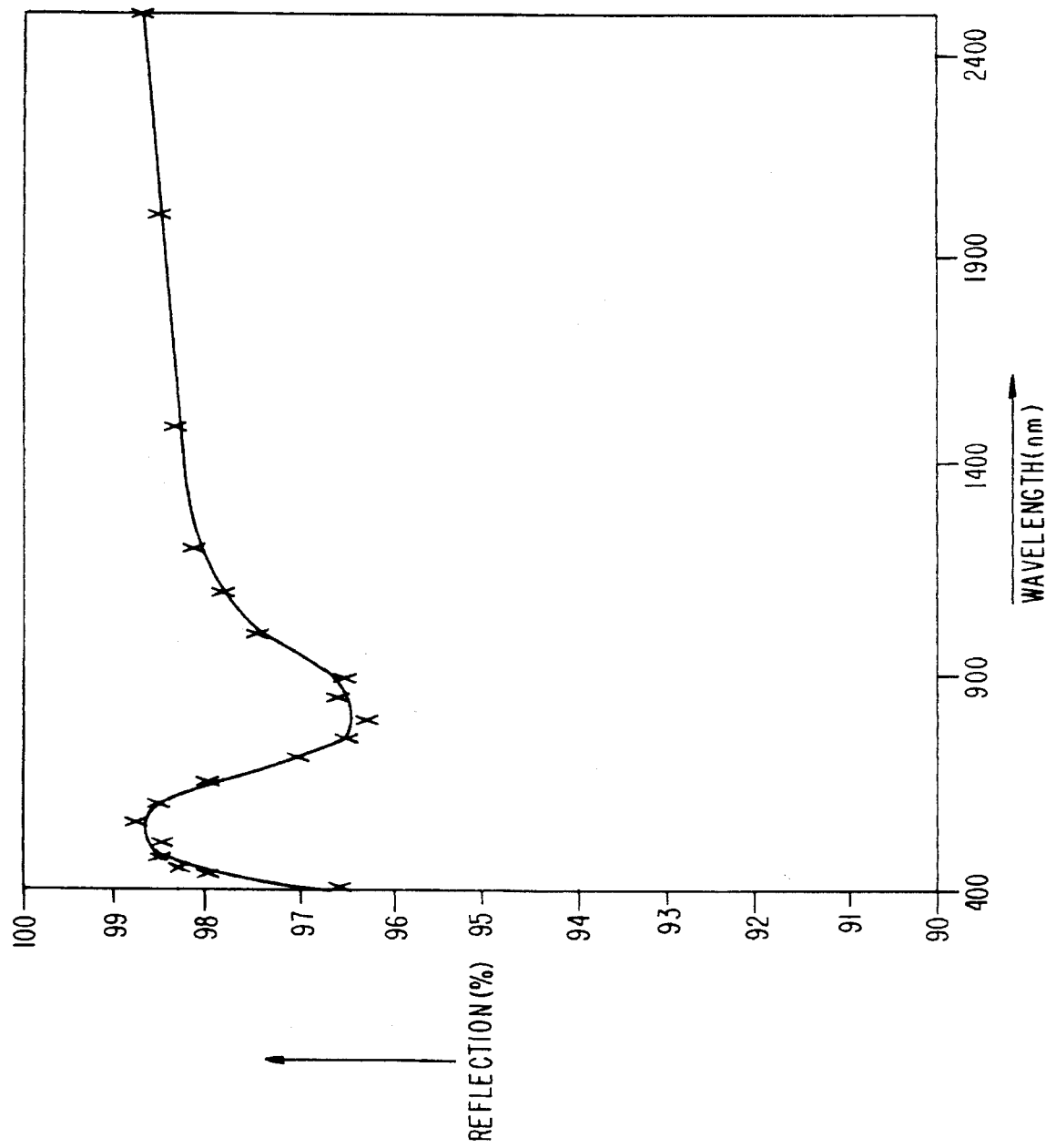
FIG. 1 is a graph showing the reflection of a mirror of the present invention, in the range from 400 nm to 2,500 nm.

Solutions for providing the high-reflection silver mirror according to the invention, can have the following layer structure with layer thicknesses in the ranges given:
Substrate: for example glass
Yttrium oxide: in a layer thickness of approximately 20 nm to 250 nm ($Y_2O_3$) as the base layer for zinc sulfide,
Zinc sulfide: in a layer thickness of 20 nm to 200 nm (ZnS) as the nucleation layer for silver,
Silver mirror (Ag)≧15 nm,
Magnesium fluoride layer in a layer thickness of 5 nm to 200 nm ($MgF_2$),
Yttrium oxide in a layer thickness of 5 nm to 100 nm, wherein the two last stated layers protect the silver layer against reactions with components of the succeeding layers, for example sulphur, and serve as spectral correction layers,
Zinc sulfide (ZnS) in a layer thickness of 5 nm to 500 nm as the outer protective layer with the required optical properties.

Mirrors according to the invention and produced in this manner have been found to be very environmentally stable and to satisfy the requirements of the MIL-C-13508C regulations which provide a precisely defined sequence of particular environmental tests. These mirrors, however, have primarily been found to be resistant against hydrogen sulfide ($H_2S$).

Zinc sulfide is known to be a stable material and was found to be a favorable base for the silver. The zinc sulfide must absolutely not be applied on the silver, however, since sulphur, which is set free during the vaporization of ZnS, attacks the silver layer and the process thus becomes uncontrollable. This leads to a marked lowering of reflection, especially in the visible spectral range or wavelength range.

The substance of the invention resides in that the silver layer must so-to-speak be protected against the superjacent protective layer (ZnS), and this takes place by way of a barrier or intermediate layer. The solutions attempted in the prior art described above, which suggest packing the silver layer with a metal or a hypostoichiometric oxide layer, fail since as a rule these do not meet the optical specifications, in any case, not with very high reflection values, such as have been listed above. The barrier or intermediate layer according to the invention is a thin layer of a fluoride of the elements magnesium, barium, strontium, calcium, the rare earths or lead or, and this surprisingly is counter to the prior art, a thin oxide layer of the elements silicon, aluminum, magnesium, groups VIb, Vb, IVb, as well as scandium, yttrium, calcium, strontium, zinc, iron, indium, tin, cerium, holmium, as well as oxides of mixtures or alloys of these elements (in particular indium-tin-oxide), further oxinitrides of the elements Ti, Ta, Zr, Si, Hf, or Al. In particular, the use of magnesium fluoride as a thin layer over the silver is not obvious since, for example, in the prior art, such as for example is offered in the publication by Macleod, good $MgF_2$ must be applied hot, e.g. at 250°C., but at these temperatures silver, as a rule degrades.

In contrast, according to the invention it is suggested to apply, for example the magnesium fluoride, "cold", e.g. at temperatures of approximately 80° C. and also selecting the layer thickness to be very thin, such as for example ≦about 200 nm. The application of magnesium fluoride is carried out with conventionally known methods, such as for example, by means of boat vaporization or vaporization by means of an electron beam or also be means of a sputtering process.

It is also essential that the layers disposed above the silver layer are practically absorption-free, e.g. that these are dielectric, so that the optical requirements can be met.

Figure 2:
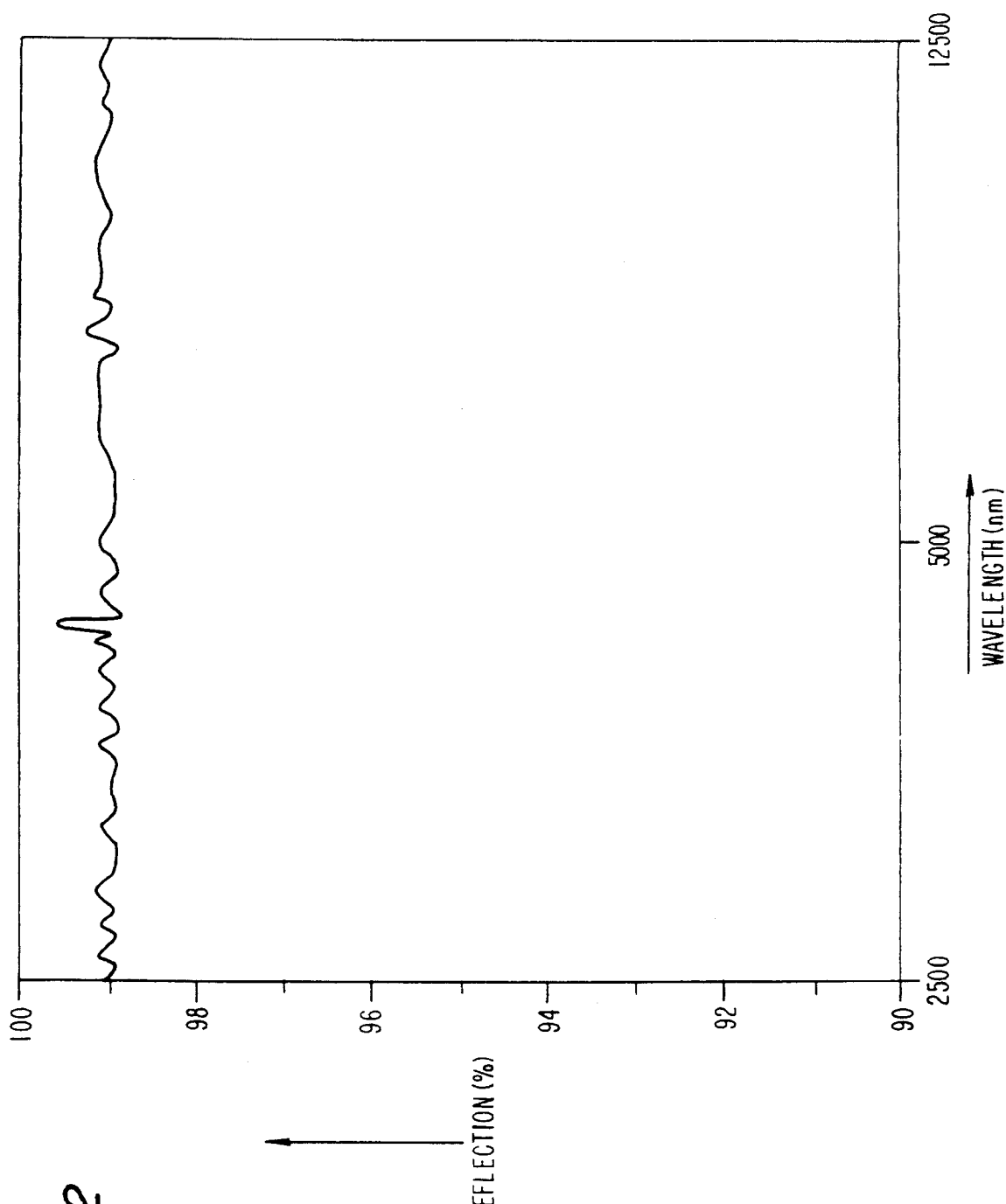
FIG. 2 is a graph similar to FIG. 1, but in the range from 2,500 nm to 12,500 nm.

The invention will subsequently be additionally explained in conjunction with a concrete example and possible variants of the layer structure, wherein the reflection of the mirror built by example, is depicted in FIG. 1 in the range from 400 nm to 2,500 nm and in FIG. 2 in the range from 2,500 nm to 12,500 nm.

EXAMPLE 1

A high-reflection silver mirror constructed according to the invention has the following layer structure:

| Glass substrate (Corning 7059) | |
|---|---|
| Yttrium oxide: | appr. 140 nm |
| Zinc sulfide: | 55 nm |
| Silver: | 120 nm |
| Magnesium fluoride: | 55 nm |
| Yttrium oxide: | appr. 20 nm |
| Zinc sulfide: | 40 nm |

All materials are applied in a conventional coating installation by means of vaporization, wherein zinc sulfide was vaporized out of a vaporization boat. The remaining materials are vaporized by means of an electron beam vaporizer. It is also possible that all materials used are vaporized either from a boat as well as also with an electron gun.

FIG. 1 graphically depicts the reflection values of the silver mirror constructed by example, for 45 degree angles of incidence over the spectral range from 400 nm to 2,500 nm. In the range between 500 nm and 600 nm, a maximum occurs with ≧98% and a minimum in the range of 700 nm to 900 nm with reflection values between 96% and 97%. This decrease of the reflection values in the range from 700 nm to 900 nm is the result of the specific layout of the layer system (and could be corrected by applying additional layers).

In the following some additionally possible variants of a layer structure according to the invention will be listed, wherein these variants are depicted in FIGS. 3a, 3b, 3c, 3d and 3e, schematically and figuratively.
Variant 1:
Substrate
Zinc sulfide as the nucleation layer
Silver: mirror
Magnesium fluoride (also possible are barium fluoride, yttrium fluoride, lanthanum fluoride, cerium fluoride, lead fluoride, etc. ) as the intermediate layer or the barrier
Zinc sulfide as the outermost cover layer
Variant 2:
Substrate
Zinc sulfide
Silver Yttrium oxide (also possible are silicon oxide SiOx, aluminum oxide, magnesium oxide, hafnium oxide, zirconium oxide etc. )
Zinc sulfide
Variant 3:
Substrate
Zinc sulfide
Silver
Magnesium fluoride
Yttrium oxide
Zinc sulfide
Variant 4:
Substrate
Zinc sulfide
Silver
Yttrium oxide
Magnesium fluoride
Zinc sulfide
Variant 5:
Substrate
(any layer system)
Zinc sulfide
Silver
Magnesium fluoride
Yttrium oxide
Zinc sulfide layer system As illustrated in FIG. 3(e), it is also conceivable that, in order to achieve particular additional optical effects (corrections of the spectral curve of the reflections) layer packets or systems, potentially even one of the variants themselves, are added to variants 1 to 4 such as to variant 3 as shown.

It is indeed possible to omit the zinc sulfide layer disposed between the silver and the substrate, however, it has been found to be extremely advantageous to apply such a layer. Note the last reason is that, since small defects may occur in the silver layer, the subjacent zinc sulfide layer can prevent the silver mirror from being attacked from the direction of its rear surface, by means of the medium penetrating through the defect, and thus causing corrosion.

The zinc sulfide layer as the base of the silver layer, in addition, suppresses the corrosion from the margins of the silver layer, in particular if relatively large substrates coated with the layer system according to the invention are to be divided to form individual units.

The silver mirrors according to the invention listed in conjunction with the examples and embodiments, serve only for explaining the present invention and it is understood that these can be varied or modified in any given way on the basis of the definitions in the claims. It is essential to the invention that between the silver mirror and a further protective layer, a barrier or intermediate layer is disposed in order to permit additional protection of the silver layer and also in order to make possible high-reflection properties of the silver mirror. It is further advantageous that the Ag layer is applied on a zinc sulfide layer.

What is claimed is:

1. A high-reflection silver mirror comprising:

a substrate;

a first layer configuration containing at least one layer, on said substrate;

at least one silver layer on said first layer configuration;

a barrier layer configuration on said at least one silver layer, said barrier layer configuration containing at least one layer, said barrier layer configuration having a thickness of from 5 to 200 nm;

a zinc sulfide layer on said barrier layer configuration, said zinc sulfide layer having a thickness of from 5 to 500 nm; and a second layer configuration containing at least one layer, on said zinc sulfide layer;

said barrier layer configuration having a thickness which is less than 100 nm, said at least one silver layer, said barrier layer configuration, said zinc sulfide layer and said second layer configuration being selected so that with a light angle of incidence of 45°, and across a light spectrum of 400 nm to 12,500 nm, the silver mirror has a reflection value greater than 96%.

2. A high-reflection silver mirror as stated in claim 1, wherein the barrier layer configuration comprises a dielectric material.

3. A high-reflection silver mirror as stated in claim 1, wherein the barrier layer configuration comprises indium-tin-oxide.

4. A high-reflection silver mirror as stated in claim 1, further including at least one intermediate layer between said at least one silver layer and said zinc sulfide layer, said intermediate layer being made of a different material than said at least one barrier layer configuration.

5. A high-reflection silver mirror as stated in claim 1, including a further zinc sulfide layer between said first layer configuration and said least one silver layer, said further zinc sulfide layer having a thickness of from 20 to 200 nm.

6. A high-reflection silver mirror as stated in claim 1, where the barrier layer configuration comprises at least one layer selected from the group consisting of:

oxides of silicon, aluminum, magnesium, a group IVb element, a group Vb element, a group IVb element, scandium, yttrium, calcium, strontium, zinc, iron, indium, tin, cerium, and holmium; and mixtures of said oxides.

7. A high-reflection silver mirror as stated in claim 1, where the barrier layer configuration comprises at least one layer selected from the group consisting of:

an oxinitride of Ti, Ta, Zr, Si, Hf, and Al;

and a fluoride of magnesium, barium, strontium, calcium, a rare earth and lead.

* * * * *